United States Patent

[11] 3,583,507

| [72] | Inventor | Wolfgang Trautwein |
| | | 3529 Carroll Circle S.E., Huntsville, Ala. 35801 |
| [21] | Appl. No. | 806,828 |
| [22] | Filed | Mar. 13, 1969 |
| [45] | Patented | June 8, 1971 |

[54] SNOW VEHICLES
4 Claims, 7 Drawing Figs.

[52] U.S. Cl. .................................................. 180/5,
180/3, 180/9.24A, 280/21
[51] Int. Cl. ...................................................... B62m 27/02
[50] Field of Search .......................................... 180/3, 5,
9.24; 280/21, 21.1

[56] References Cited
UNITED STATES PATENTS

| 2,700,427 | 1/1955 | Schomers | 180/3 |
| 2,905,479 | 9/1959 | Schomers | 280/16 |
| 3,480,289 | 11/1969 | Larkin | 180/3X |

FOREIGN PATENTS

| 986,197 | 3/1951 | France | 180/9.24(A) |
| 1,032,750 | 4/1953 | France | 280/21(.1) |

*Primary Examiner*—Leo Friaglia
*Attorney*—C. A. Phillips

ABSTRACT: A powered snow vehicle is disclosed in which the snow contacting surfaces and a body frame with seated passengers can tilt or bank with respect to the terrain in order to obtain improved stability, maneuverability, and control.

PATENTED JUN 8 1971 3,583,507

SHEET 1 OF 2

SNOW VEHICLES

This invention relates to a powered snow vehicle and consists of the combinations, constructions, and arrangement of parts, as herein after described and claimed.

A principal object of this invention is to provide a snow vehicle with greater maneuverability, control, and stability on slopes and turns than that possessed by conventional snowmobiles or powered sleds.

Another object is to provide a snow vehicle with means whereby the riders can actively participate in steering by leaning and balancing in the manner of bicycle or motorcycle riding.

A further object is to provide a recreational snow vehicle from which greater riding satisfaction and enjoyment can be derived than from more ordinary snow vehicles.

Other objects and advantages of this invention will become apparent as the specification proceeds. The novel features will be pointed out in the appended claims.

Figure 1:
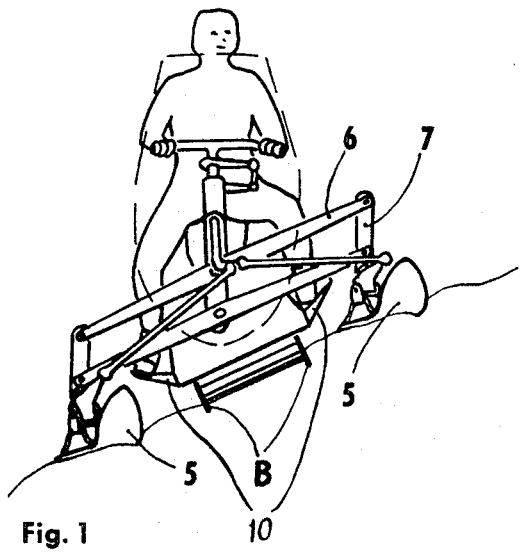
Figure 2:
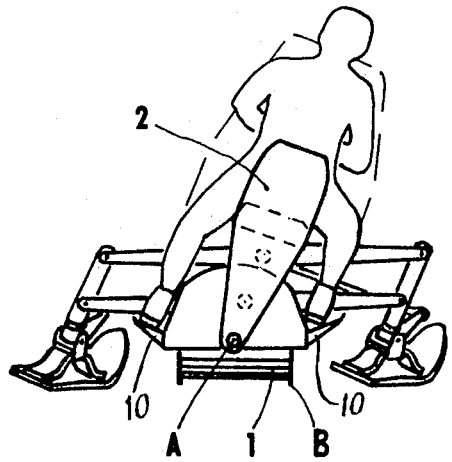
Figure 3:
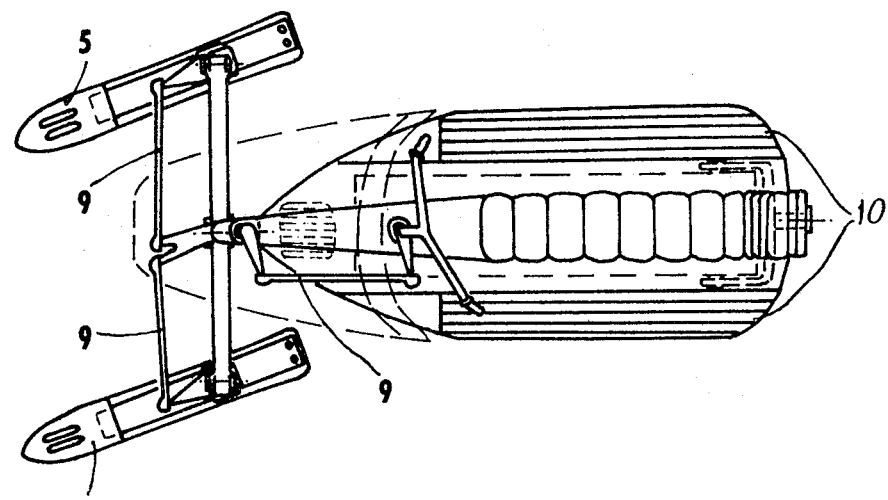
Figure 4:
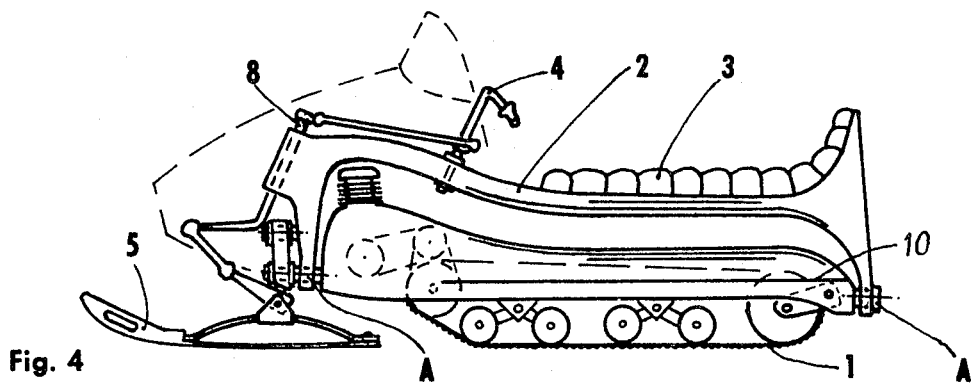
Figure 5:
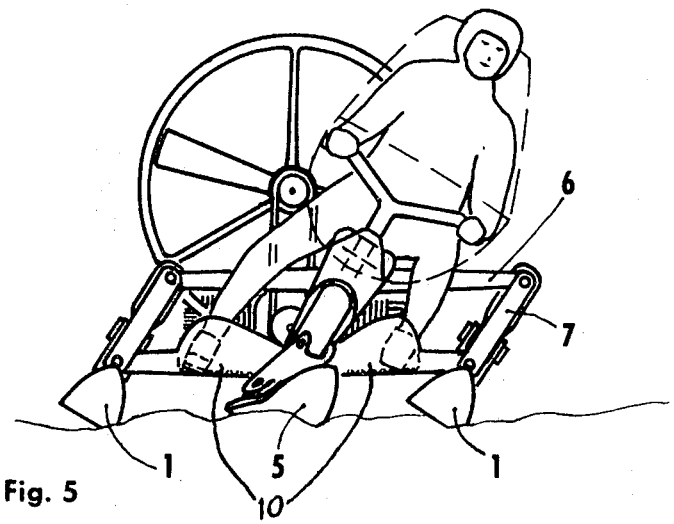
Figure 6:
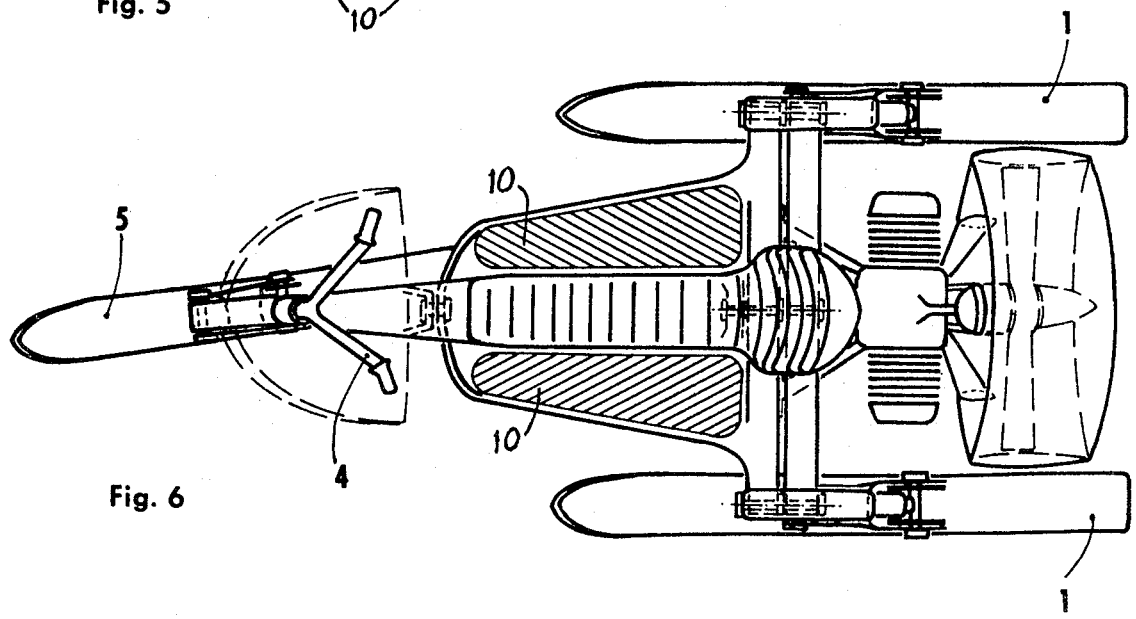
Figure 7:
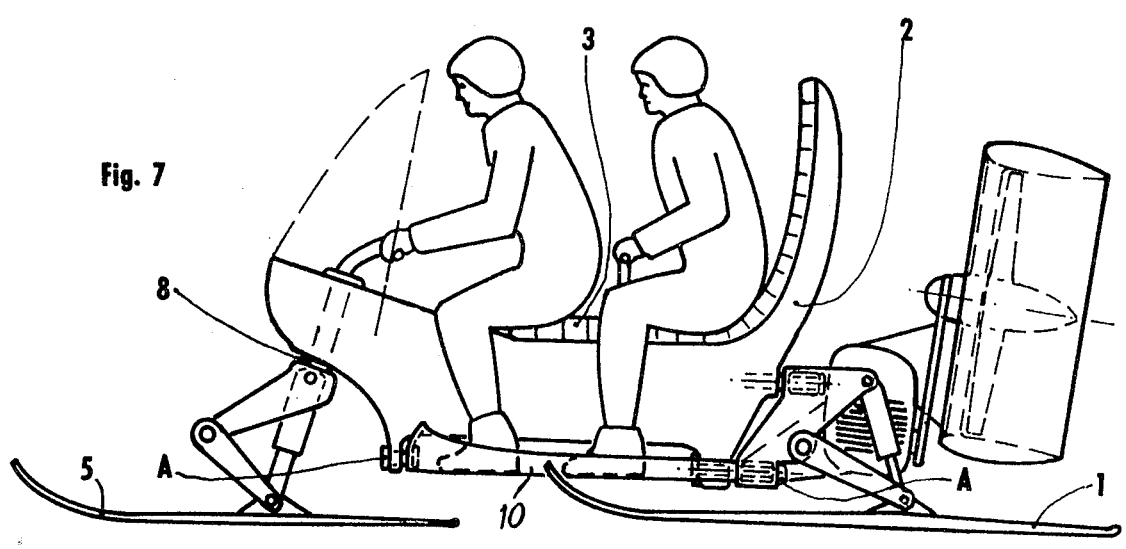

For a better understanding of the invention, reference should be made to the accompanying drawings, forming part of the specification, in which:

FIG. 1 is a front view of the snow vehicle.
FIG. 2 is a rear view of the snow vehicle.
FIG. 3 is a top plan view of the snow vehicle.
FIG. 4 is a side elevation of the snow vehicle.
FIG. 5 is a front view of an alternative snow vehicle.
FIG. 6 is a top plan view of an alternative snow vehicle.
FIG. 7 is a side elevation of an alternative snow vehicle.

It is to be understood that while these drawings show only specific embodiments of this invention various changes, combinations, or modifications may be made within the scope of the appended claims without departing from the spirit of the invention.

Referring now to the drawings in detail, the numbers 1 show a rear terrain contacting structure. Several embodiments of said structure are possible depending on the propulsive means employed. For example, the rear terrain contacting structure 1 depicted in FIGS. 1 through 4 is a driven track of the type presently used on conventional snowmobiles, while in FIGS. 5 through 7 the rear terrain contacting structure 1 consists of two skis and propulsive power is supplied by a ducted propeller.

A main body member 2 is linked to the rear terrain contacting structure in a manner such that said main body member can rotate about an axis disposed in a fore and aft or longitudinal direction, thus permitting said main body member to tilt or bank with respect to the terrain. Said rotation is permitted by the bearings A indicated in FIGS. 2, 4, and 7.

A seat 3 is mounted on the main body member and may seat one passenger or several passengers riding in tandem. Manual controls 4, preferably handlebars, are located for easy reach by the foremost occupant of the seat.

The main body member 2 extends toward the front to overlie a forward terrain contacting structure 5. Specific embodiments of said forward terrain contacting structure 5 may consist of the single ski depicted in FIGS. 5 through 7, or alternatively, the two skis depicted in FIGS. 1 through 4.

The linkage which connects the front terrain contacting structure 5 and the rear terrain contacting structure 1 to the main body member 2 is preferably such that when the main body member tilts or banks, the terrain contacting structures will tilt or bank in unison. For example, in the embodiment depicted in FIG. 5, the parallelogram linkage, consisting of the horizontal bars 6 and the vertical members 7 permits the rear skis to tilt in unison with the main body member. FIG. 1 depicts an alternative embodiment wherein a similar parallelogram linkage is employed to attach the two front skis.

The purpose of the above described tilting or banking of the terrain contacting structures is to allow these structures to dig into the snow while turning in order to prevent or alleviate skidding. In FIGS. 1 and 2, an additional antiskid device B is depicted which may be employed to prevent skidding of the driving track.

A steering column 8 is journaled to the main body member 2 so that the forward terrain contacting structure may be turned by the handlebars in order to steer the vehicle. Referring to FIG. 3, turning of the front skis is accomplished through the steering linkages 9. Alternatively, a single ski, attached to the lower end of the steering column 8 and turning with said column, may be employed as indicated in FIG. 7.

To operate the snow vehicle, an occupant takes a position on the seat, places his feet on the footrests 10, and uses the handlebars in an obvious manner. When making a turn on level terrain he can lean into the turn in the manner shown in FIGS. 2 and 5. On rough or hilly terrain he can lean uphill as shown in FIG. 1 in order to adjust his center of gravity to the position most favorable for negotiating the terrain. The simultaneous banking of the vehicle body and the terrain contacting structures provides maneuverability and control greatly superior to that which can be obtained with more conventional snow vehicles.

I claim:
1. A snow vehicle comprising:
a main body member for supporting at least one rider;
first snow engaging means for supporting the rear portion of said snow vehicle;
propulsion means supported on said first snow engaging means for driving said snow vehicle;
second snow engaging means for supporting the front portion of said snow vehicle;
pivotal mounting means for supporting said main body member on said first and second snow engaging means for pivotal movement about a pivotally interconnected axis generally parallel to the longitudinal axis of said snow vehicle;
steering means including means interconnecting said second snow engaging means with said main body member for rotating said second snow engaging means about substantially vertical axis;
one of said first and second snow engaging means comprising a ski assembly in turn comprising a pair of laterally spaced skis and a pivotally interconnected four-arm parallelogram force coupler comprising a pair of spaced laterally extending cross arms and a pair of vertically extending spaced outboard arms and wherein said skis are mounted to two said outboard arms of said force coupler;
said main body member being pivotally coupled at spaced, central points to crossarms of said force coupler;
control means comprising a reference platform including first and second foot engaging surfaces on opposite sides of said main body member and including means for supporting and maintaining said reference platform on one of said snow engaging means in a plane substantially parallel to the terrain under the snow vehicle,
whereby a rider mounted on said main body member may apply a differential force to said first and second foot engaging surfaces with respect to said main body member and cause said snow vehicle to tilt with respect to said terrain.

2. A snow vehicle as set forth in claim 1 wherein said first snow engaging means comprises a continuously movable track in engagement with terrain, said propulsion means drives said continuously movable track, said second snow engaging means comprises said ski assembly, an said reference platform is rigidly connected to said first snow engaging means.

3. A snow vehicle as set forth in claim 1 wherein said first snow engaging means comprises said ski assembly and said reference platform is rigidly attached to the lower crossarm of said parallelogram force coupler.

4. A snow vehicle as set forth in claim 3 wherein said propulsion means comprises an air propeller drive unit mounted on the lower crossarm of said parallelogram force coupler.